United States Patent [19]

Hoffmann et al.

[11] Patent Number: 5,276,097
[45] Date of Patent: Jan. 4, 1994

[54] COATING AGENT BASED ON POLYMERS CONTAINING CARBOXYL GROUPS AND CROSSLINKING AGENTS CONTAINING EPOXIDE GROUPS, PROCESSES FOR THE PREPARATION OF THE COATING AGENT AND ITS USE

[75] Inventors: Peter Hoffmann, Senden; Werner Alfons Jung, Ascheberg; Elisabeth Kappes, Mannheim; Manfred Niessner, Ludwigshafen, all of Fed. Rep. of Germany

[73] Assignees: BASF Lacke; Farben Aktiengesellschaft, Munster, Fed. Rep. of Germany

[21] Appl. No.: 820,621

[22] PCT Filed: Jul. 18, 1990

[86] PCT No.: PCT/EP90/01173
§ 371 Date: Jan. 24, 1992
§ 102(e) Date: Jan. 24, 1992

[87] PCT Pub. No.: WO91/02036
PCT Pub. Date: Feb. 21, 1991

[30] Foreign Application Priority Data
Jul. 26, 1989 [DE] Fed. Rep. of Germany ....... 3924818

[51] Int. Cl.$^5$ ............................................. C08L 67/02
[52] U.S. Cl. .................. 525/167; 525/165; 525/530; 525/531; 525/533; 528/112; 528/297
[58] Field of Search .............. 525/165, 167, 530, 531, 525/533; 528/112, 297

[56] References Cited

U.S. PATENT DOCUMENTS

| 3,989,767 | 11/1976 | Homma et al. | 525/28 |
| 4,137,277 | 1/1979 | Nordstrom et al. | 525/169 |
| 4,190,569 | 2/1980 | Kroker et al. | 524/376 |
| 4,346,144 | 8/1982 | Craven | 525/161 |
| 4,476,261 | 10/1984 | Patzschke et al. | 523/415 |
| 4,499,239 | 2/1985 | Murakami et al. | 525/111 |
| 4,529,787 | 7/1985 | Schmidt et al. | 526/209 |
| 4,670,485 | 6/1987 | Hesse et al. | 525/69 |
| 4,897,450 | 1/1990 | Craun et al. | 525/166 |

Primary Examiner—Melvyn I. Marquis
Assistant Examiner—Randy Gulakowski
Attorney, Agent, or Firm—Frank G. Werner; Paul L. Marshall

[57] ABSTRACT

The present invention relates to coating agents containing

A) one or more polymers containing carboxyl groups and having a number-average molecular weight of 500 to 8,000 and an acid number of 15 to 200 mg of KOH/g as the essential binder component and B) one or more compounds containing epoxide groups as crosslinking agents, wherein the compound B containing epoxide groups is a copolymer containing epoxide groups, has a number-average molecular weight $M_n$ of 300 to 5,000, preferably 500 to 3,500, and a heterogeneity ($M_w/M_n$), measured by gel permeation chromatography, of $\leq 3$, preferably of $\leq 2$, and has been prepared by continuous bulk polymerization at temperatures between 130° and 350° C. and pressures above 1 bar.

The invention also relates to processes for the preparation of the coating agent and the use of the coating agents in automobile refinishing.

18 Claims, No Drawings

COATING AGENT BASED ON POLYMERS CONTAINING CARBOXYL GROUPS AND CROSSLINKING AGENTS CONTAINING EPOXIDE GROUPS, PROCESSES FOR THE PREPARATION OF THE COATING AGENT AND ITS USE

The invention relates to coating agents containing

A) one or more polymers containing carboxyl groups and having a number-average molecular weight $M_n$ of 500–8,000 and an acid number of 15 to 200 mg of KOH/g as the essential binder component and B) one or more compounds containing epoxide groups as the crosslinking agent.

Coating agents which contain polymers containing carboxyl groups as the binder and compounds containing epoxide groups as the crosslinking agent are known and are described, for example, in international PCT publication WO 87/02041, EP-A-103,199, EP-B-51,275, EP-A-123,793, DE-AS 2,635,177, Japanese Preliminary Published Specification 219,267/83, Japanese Preliminary Published Specification 76,338/77 and Japanese Preliminary Published Specification 53,145/79.

If these coating agents based on polymers containing carboxyl groups and epoxide compounds are to be hardened at low temperatures (that is to say $\leq 80°$ C.), this requires the use of highly reactive epoxide compounds. However, such epoxide compounds based on aliphatic epoxides have usually proved to be mutagenic in the Ames test. This is to be attributed on the one hand to high contents of oligomeric constituents, but on the other hand also to the preparation process, that is to say the reaction with epichlorohydrin and the associated residual content of epichlorohydrin.

Epoxide compounds which are less toxicologically unacceptable are usually very high molecular weight compounds and are therefore less reactive, or they are built up on the basis of bisphenol A or bisphenol F and are unsuitable for use as a top or clear coat because of their tendency to yellow. Finally, acrylate copolymers which contain epoxide groups and have been prepared by conventional methods are likewise unsuitable for toxicological reasons, because of their high content of residual monomers.

The disadvantage of the known coating agents based on polymers containing carboxyl groups and epoxy crosslinking agents is moreover often the high viscosity of the coating agents and thus the low solids content of the coating agents at a viscosity which is advantageous for processing. This leads to high pollution of the environment with solvent during drying of the coating films.

Low-solvent stoving lacquers which consist of acrylate resin containing carboxyl groups, epoxy resin containing at least 2 oxirane groups per molecule, solvents and if appropriate pigment, catalyst and other auxiliaries are thus known from DE-PS 2,728,459. The acrylate resin containing carboxyl groups which is employed as the binder is prepared in bulk by means of free radical polymerization under pressures of 1.5 to 30 bar at temperatures of 160° to 280° C. and is distinguished by a low heterogeneity, measured by gel permeation chromatography, of between 1.5 and 2.0 and a number-average molecular weight of 1,500 to 3,000. However, since the epoxide compounds based on bisphenol A or compounds prepared using epichlorohydrin or acrylate copolymers containing epoxide groups which are usually employed are used as the crosslinking agent, these stoving enamels also have the abovementioned disadvantages caused by these crosslinking agents, such as a tendency to yellow and/or toxicity.

The preparation of acrylate copolymers containing functional groups, such as, for example, hydroxyl, carboxyl, epoxide, isocyanate or amino groups, and having only a low dispersity, a low number-average molecular weight of 500 to 6,000 and a low viscosity of the resulting solutions of the acrylate copolymers is also known from EP-A-96,901. The acrylate copolymers are prepared by means of a continuous bulk polymerization process, if appropriate under pressure, at polymerization temperatures between 180° and 270° C.

Coating agents which contain acrylate copolymers containing hydroxyl groups and prepared by the process of EP-A-96,901 as binders and urea resins, melamine resins or benzoguanamine resins as well as polyisocyanates or polyepoxides as crosslinking agents are also described in EP-A-96,901.

The present invention provides coating agents which are based on polymers containing carboxyl groups as crosslinking agents and can be hardened at such low temperatures (about $\leq 80°$ C.) that they are suitable for car refinish. The coating agents should also have the lowest possible solvent content at a viscosity favorable for processing, which is 16 to 20 s measured in a flow cup according to DIN 4 at 23° C. The coating agents should moreover be as acceptable as possible from the toxicology point of view, that is to say in particular they should have the lowest possible residual monomer content. The coating agents should and be usable both as a primer and as a top and/or clear coat, that is to say they should lead to coatings which have only a slight tendency or no tendency at all to yellow. Finally, the coating agents should exhibit a good flow and a low tendency to run even on vertical surfaces, and lead to coatings having a good gloss and good hardness, coupled with good flexibility and good resistance to chemicals.

Surprisingly, this object is achieved by a coating agent containing

A) one or more polymers containing carboxyl groups and having a number-average molecular weight $M_n$ of 500–8,000 and an acid number of 15 to 200 mg of KOH/g as the essential binder component and B) one or more compounds containing epoxide groups as crosslinking agents.

The coating agent contains a compound B containing epoxide groups which is a copolymer containing epoxide groups, has a number-average molecular weight $M_n$ of 300 to 5,000, preferably 500 to 3,500, and a heterogeneity $(M_w/M_n)$, measured by gel permeation chromatography, of $\leq 3$, preferably of $\leq 2$, and has been prepared by continuous bulk polymerization at temperatures between 130° and 350° C. and pressures above 1 bar.

The present invention furthermore also relates to a process for the preparation of the coating agents and the use of the coating agents in car repair lacquering, as a primer, top lacquer or clear lacquer.

It is surprising and was not predictable that the coating agents according to the invention can be processed with high solids contents of up to 80% by weight at a spray viscosity of 16 to 20 seconds, measured in a flow cup according to DIN 4 at 23° C., are less toxicologically unacceptable than conventional comparable coating agents, exhibit a good flow and a low tendency to run, even on vertical surfaces, and lead to coatings which can be hardened at low temperatures ($\leq 80°$ C.) and exhibit a good gloss and good hardness, coupled with a good elasticity and good resistance to chemicals.

The preparation of the compounds containing epoxide groups employed as crosslinking agent B will first be explained in more detail below, followed by the preparation of the polymers containing carboxyl groups employed as binder A and the preparation of the coating agents using components A and B.

The compounds containing epoxide groups employed as crosslinking agents in the coating agents according to the invention are prepared by means of continuous bulk polymerization at temperatures between 130° and 350° C. and pressures above 1 bar, as a rule under pressures between 2 and 200 bar, preferably under pressures between 5 and 120 bar. The continuous bulk polymerization process is known per se and is described, for example, in EP-A-96,901. The polymerization process will therefore be explained only briefly, and reference is made to EP-A-96,901 for further details.

The copolymers containing epoxide groups employed according to the invention are prepared in pressure apparatuses, such as, for example, pressure kettles, pressure kettle cascades, pressure tubes with and without mixing elements or else in pressure kettles in combination with pressure tubes. The pressure kettles can be equipped with various mixing units, such as stirrers or a mixing circulation with a circulation pump. The pressure apparatuses are furthermore provided with devices for regulation of the temperature of the contents of the reactor, such as, for example, internal cooling or heating coils or a cooling or heating jacket. The amount of heat liberated during the polymerization can maintain the temperature required for the polymerization, or it is necessary to heat or cool the reaction zone, depending on the monomer composition and depending on the amount of monomers fed in per unit time.

To carry out the polymerization reaction, the various monomers are either mixed before introduction into the polymerization reactor and the mixture is then metered into the reactor, or else the various monomers are metered into the reactor individually in the desired ratio with the aid of pumps. The copolymerization is then carried out in polymerization reactors having low contents, so that a stable state is already reached shortly after the start of the polymerization. In this way it is also possible for one type of copolymer to be changed to another without problems and rapidly.

The residence time of the reaction mixture in the polymerization apparatuses is 2 to 60 minutes. Preferably, however, an average residence time—defined as the reactor volume divided by the volume of monomer mixture fed in per unit time—of 10 to 40 minutes is preferably maintained.

A preferred embodiment of the bulk polymerization process comprises producing periodic pressure variations in the polymerization reactor during the polymerization, as described, for example, in DE-OS-3,026,831. The periodic pressure variations with a pressure difference of 15 to 100 bar at a frequency of the pressure variations of 6 to 300 per hour are generated, for example, by forcing in an inert gas periodically and then ensuring the reactor is let down, or, for example, by program-controlled regulation of the maintenance of the pressure with the aid of customary devices. The program control can be based on, for example, sine oscillation or saw-tooth oscillation with amplitudes in the stated pressure limits and frequencies of 6 to 300 oscillations per hour.

Because of the periodic pressure variations in the polymerization apparatus, a pulsed flow of the reaction mixture also occurs in this. The polymer formed thus has a varying residence time spectrum, which in turn results in a broader chemical and physical uniformity than in the non-pulsed procedure. The pulsed flow within the polymerization apparatus moreover avoids caking and thermal damage of the copolymer in the reactor. The bulk polymerization reaction can be carried out either without initiators or in the presence of 0.01 to 5% by weight, based on the weight of monomers employed, of a suitable initiator.

Suitable free radical initiators are organic peroxides, such as, for example, dibenzoyl peroxide, dicumyl peroxide, cumene hydroperoxide, di-tert.-butyl peroxide, tert.-butyl amyl peroxide, tert.-butyl hydroperoxide, 2,2-di-tert.-butylperoxybutane, tert.-amyl perbenzoate, 1,3-bis(tert.-butylperoxyisopropyl)-benzene, diisopropylbenzene monohydroperoxide and diacyl peroxides, such as, for example, diacetyl peroxide, peroxyketal, such as, for example, 2,2-di(tert.-amylperoxy)-propane and ethyl 3,3-di-(tert.-amylperoxy)-butyrate, and thermally unstable highly substituted ethane derivatives, for example based on silyl-substituted ethane derivatives and based on benzopinacol. Aliphatic azo compounds, such as, for example, azobiscyclohexanenitrile, can furthermore also be employed.

The polymerization reaction is advantageously carried out without polymerization regulators. The molecular weight of the copolymers containing epoxide groups which have been prepared is rather controlled on the one hand via the polymerization temperature and on the other hand via the amount added of monomers having at least 2 ethylenically unsaturated double bonds.

The polymerization is preferably carried out in the absence of solvents. However, it is also possible to add small amounts (up to 20% by weight, based on the monomer mixture) of solvents in order thus to control the polymerization. Solvents which are particularly suitable for this are those which react with at least one of the monomers, such as, for example, ethylene glycol, propylene glycol and the like. The copolymers B containing epoxide groups which are prepared by the bulk polymerization process have number-average molecular weights $M_n$ of between 300 and 5,000, preferably between 500 and 3,500, and a heterogeneity (weight-average molecular weight $M_w$/number-average molecular weight $M_n$), measured by gel permeation chromatography, of $\leq 3$, preferably $\leq 2$. The heterogeneity is measured here by generally known methods (compare, for example, B. Vollmert, Grundriß der makromolekularen Chemie (Principles of macromolecular chemistry), E. Vollmert-Verlag, Karlsruhe 1982, Volume III, page 72 et seq.) against a polystyrene standard.

These copolymers B containing epoxide groups are prepared by copolymerization of a) 10 to 60% by weight, preferably 15 to 50% by weight, of one or more vinylaromatic hydrocarbons, b) 10 to 50% by weight, preferably 15 to 30% by weight, of one or more ethylenically unsaturated monomers containing at least one epoxide group per molecule and c) 5 to 80% by weight, preferably 20 to 50% by weight, of other ethylenically unsaturated copolymerizable monomers, the sum of the weight contents of components a to c in each case being 100% by weight.

Component a is a monovinylaromatic compound. It preferably contains 8 or 9 carbon atoms per molecule. Examples of suitable compounds are styrene, vinyltoluenes, α-methylstyrene, chlorostyrenes, o-, m- or p-methylstyrene, 2,5-dimethylstyrene, p-methoxystyrene, p-tert.-butylstyrene, p-dimethylaminostyrene, p-acetamidostyrene and m-vinylphenol. Vinyltoluenes and in particular styrene are preferably employed.

Examples of monomers having at least one epoxide group per molecule (component b) are glycidyl acrylate, glycidyl methacrylate, allyl glycidyl ether, glycidyl crotonate, glycidyl α-ethylacrylate and crotonyl glycidyl ether. Glycidyl methacrylate and/or glycidyl acrylate are preferably employed.

Compounds which are particularly suitable as component c are alkyl esters of acrylic and methacrylic acid, such as, for example, methyl (meth)acrylate, ethyl (meth)acrylate, propyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate and octadecenyl (meth)acrylate.

Other ethylenically unsaturated monomers can preferably be employed together with these alkyl esters of acrylic and methacrylic acid, but also exclusively as component c, the choice of these monomers largely depending on the desired properties of the coating agents in respect of hardness, elasticity, compatibility and polarity.

Examples of other suitable ethylenically unsaturated monomers are the alkyl esters of maleic, fumaric, tetrahydrophthalic, crotonic, isocrotonic, vinylacetic and itaoonic acid, such as, for example, the corresponding methyl, ethyl, propyl, butyl, isopropyl, isobutyl, pentyl, amyl, isoamyl, hexyl, cyclohexyl, 2-ethylhexyl, octyl, 3,5,5-trimethylhexyl, decyl, dodecyl, hexadecyl, octadecyl and octadecenyl esters.

Small amounts of monomers containing at least two polymerizable olefinically unsaturated double bonds can furthermore also be employed. The content of these monomers is preferably less than 5% by weight, based on the total weight of the monomers. Examples of suitable compounds are the compounds listed on pages 27 to 28 of this description.

The resulting copolymers containing epoxide groups in general have epoxide equivalent weights of 150 to 2,000, preferably 500 to 1,000.

The small amounts of monomers which may still be present are preferably removed from the polymer—for example by distillation—directly after the bulk polymerization reaction. In contrast to the preparation of copolymers by means of solution polymerization, because of the absence of solvents in the copolymers prepared by the bulk polymerization process this takes place quite without problems. To prepare the coating agents according to the invention, the copolymers containing epoxide groups are usually dissolved in one or more organic solvents. This crosslinking agent solution is then mixed with the binder solution only immediately before application of the coating agents. Examples of solvents which are suitable for dissolving the copolymers containing epoxide groups are relatively highly substituted aromatics, such as, for example, Solvent Naphtha ®, heavy benzene, various Solvesso ® grades, various Shellsol ® grades and Deasol, higher-boiling aliphatic and cycloaliphatic hydrocarbons, such as, for example, various white spirits, mineral turpentine oil, tetralin and decalin, as well as esters, such as, for example, butyl acetate, pentyl acetate, ethoxyethyl propionate and 1-methoxypropyl 2-acetate. Mixtures of various solvents can of course also be employed.

The coating agents according to the invention contain as essential binder component one or more polymers containing carboxyl groups and having a number-average molecular weight $M_n$ of 500 to 8,000 and an acid number of 15 to 200 mg of KOH/g, preferably 30 to 120 mg of KOH/g. The carboxyl groups can be introduced here directly by using units containing carboxyl groups when building up the polymers However, it is also possible for a polymer containing hydroxyl and if appropriate carboxyl groups and having an OH number of 15 to 200 mg of KOH/g first to be built up and for all or some of the carboxyl groups to be introduced in a second stage by reaction of the polymers containing hydroxyl and if appropriate carboxyl groups with carboxylic acid anhydrides.

Carboxylic acid anhydrides which are suitable for addition onto the polymers containing hydroxyl groups are the anhydrides of aliphatic, cycloaliphatic and aromatic saturated and/or unsaturated di- and polycarboxylic acids, such as, for example, the anhydrides of phthalic acid, tetrahydrophthalic acid, hexahydrophthalic acid, succinic acid, maleic acid, itaconic acid, glutaric acid, trimellitic acid and pyromellitic acid, and halogenated or alkylated derivatives thereof.

Anhydrides of phthalic acid and tetrahydro- and hexahydrophthalic acid and 5-methylhexahyirophthalic anhydride are preferably employed.

The polymers containing hydroxyl groups are reacted with the carboxylic acid anhydrides at temperatures of 50° to 140° C. in the presence of a catalyst, such as, for example, tertiary amines.

The polymers containing carboxyl groups are copolymers containing carboxyl groups and/or polyesters containing carboxyl groups. The polyesters containing carboxyl groups can be built up by the customary methods (compare, for example, B. Vollmert, Grundriß der makromolekularen Chemie (Principles of macromolecular chemistry), E. Vollmert-Verlag Karlsruhe 1982, Volume 11, page 5 et seq.) from aliphatic and/or cycloaliphatic alcohols which contain two, three or more functional groups, if appropriate together with monohydric alcohols, and from aliphatic and/or cycloaliphatic carboxylic acids and polycarboxylic acids containing a higher number of functional groups. Examples of suitable alcohols are ethylene glycol, 1,2-propanediol, 1,3-propanediol, 2,2-dimethyl-1,3-propanediol,1,2-butanediol,1,3-butanediol, 1,4-butanediol, 1,5-pentanediol, 3-methyl-1,5-pentanediol, 1,6-hexanediol, 2-ethyl-1,6-hexanediol, 2,2,4-trimethyl-1,6-hexanediol, 1,4-dimethylolcyclohexane, glycerol, trimethylolethane, trimethylolpropane, pentaerythritol, etherification products of diols and polyols, for example di- and triethylene glycol, polyethylene glycol and the neopentyl glycol ester of hydroxypivalic acid.

Examples of suitable carboxylic acids are adipic, azelaic, tetrahydrophthalic, hexahydrophthalic and endomethylenetetrahydrophthalic acid, and derivatives thereof which are capable of esterification.

The polyesters containing carboxyl groups which are employed in the coating agents according to the invention can contain tertiary amino groups if appropriate. These tertiary amino groups can be introduced into the polymer in the most diverse ways. On the one hand, carboxylic acids and/or alcohols containing tertiary amino groups can be employed when building up the polyesters, and on the other hand the tertiary amino groups can also be introduced in a second stage. This can be carried out, for example, by reaction of polymers containing hydroxyl groups with carboxylic acids which contain a tertiary amino group or with compounds which contain on average 0.8 to 1.5, preferably one, free isocyanate group and at least one tertiary amino group per molecule. The polymers containing carboxyl groups can furthermore also be reacted with compounds which, in addition to a tertiary amino group, also contain an alcohol, thiol or primary or secondary amino group.

However, acrylate copolymers containing carboxyl groups, if appropriate in combination with the polyesters containing carboxyl groups, are preferably employed as the polymers containing carboxyl groups. Suitable copolymers containing carboxyl groups can be prepared either with the aid of free radical solution polymerization or by means of continuous bulk polymerization.

Suitable polymers A containing carboxyl groups are thus, for example, copolymers which have been prepared by continuous bulk polymerization at temperatures between 130° and 350° C. under pressures above 1 bar, as a rule under pressures between 2 and 200 bar, preferably under pressures between 5 and 120 bar. The bulk polymerization process proceeds analogously to the bulk polymerization process for the preparation of the copolymers B containing epoxide groups.

The copolymers containing carboxyl groups which are prepared by means of bulk polymerization have a heterogeneity ($M_w/M_n$), determined by gel permeation chromatography, of $\leq 3.5$, preferably $\leq 2$, and a K value (according to Fikentscher) of less than 20, preferably less than 15, as well as acid numbers of 15 to 200 mg of KOH/g, preferably 30 to 120 mg of KOH/g, and amine numbers of 0 to 50 mg of KOH/g, preferably 10 to 40 mg of KOH/g.

The copolymers A are prepared by bulk polymerization of $m_1$) 1 to 30% by weight, preferably 10 to 25% by weight, of one or more ethylenically unsaturated monomers containing carboxyl groups, $m_2$) 0 to 50% by weight, preferably 10 to 30% by weight, of one or more alkyl esters of acrylic and-/or methacrylic acid, $m_3$) 5 to 80% by weight, preferably 10 to 50% by weight, of one or more vinylaromatic hydrocarbons, $m_4$) 0 to 40% by weight, preferably 5 to 25% by weight, of one or more hydroxyalkyl esters of $\alpha,\beta$-unsaturated carboxylic acids and $m_5$) 0 to 70% by weight of other ethylenically unsaturated copolymerizable monomers, the sum of the amounts by weight of components $m_1$ to $m_5$ always being 100% by weight.

All or some of the carboxyl groups can of course also be introduced by reaction of a copolymer containing hydroxyl groups with carboxylic acid anhydrides. Examples of suitable monomers $m_1$ containing carboxyl groups are unsaturated carboxylic acids, such as, for example, acrylic, methacrylic, itaconic, crotonic, isocrotonic, aconitic, maleic and fumaric acid, half-esters of maleic and fumaric acid as well as $\beta$-carboxyethyl acrylate and adducts of hydroxyalkyl esters of acrylic acid and/or methacrylic acid with carboxylic acid anhydrides, such as, for example, mono-2-methacryloyloxyethyl phthalate.

Examples of suitable alkyl esters of acrylic and methacrylic acid (component $m_2$) are the compounds already listed as suitable components c.

Vinylaromatic compounds which are suitable as component $m_3$ are the compounds already listed as component a.

Possible components m are hydroxyalkyl esters of $\alpha,\beta$-unsaturated carboxylic acids containing primary or secondary hydroxyl groups. Hydroxyalkyl esters containing primary hydroxyl groups are predominantly employed, since they have a higher reactivity in the polymer-analogous reaction with the carboxylic acid anhydride. Mixtures of hydroxyalkyl esters containing primary hydroxyl groups and hydroxyalkyl esters containing secondary hydroxyl groups can of course also be used, for example if hydroxyl groups are required in the copolymer containing carboxyl groups, for example for adjusting the compatibility of the copolymer containing carboxyl groups.

Examples of suitable hydroxyalkyl esters of $\alpha,\beta$-unsaturated carboxylic acids containing primary hydroxyl groups are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples which may be mentioned of hydroxyalkyl esters which contain a secondary hydroxyl group and which can be used are 2-hydrox-ypropyl acrylate, 2-hydroxybutyl acrylate, 3-hydroxybutyl acrylate and the corresponding methacrylates.

The corresponding esters of other $\alpha,\beta$-unsaturated carboxylic acids, such as, for example, of crotonic acid and of isocrotonic acid, can of course in each case also be employed.

At least some of component $m_4$ can advantageously be a reaction product of one mole of hydroxyethyl acrylate and/or hydroxyethyl methacrylate and on average two moles of $\epsilon$-caprolactone.

A reaction product of acrylic acid and/or methacrylic acid with the glycidyl ester of a carboxylic acid containing a tertiary $\alpha$-carbon atom can also be employed as at least some of component $m_4$. Glycidyl esters of highly branched monocarboxylic acids are obtainable under the tradename "Cardura". The reaction of the acrylic acid or methacrylic acid with the glycidyl ester of a carboxylic acid containing a tertiary $\alpha$-carbon atom can be carried out before, during or after the polymerization reaction.

The choice of the other ethylenically unsaturated monomers $m_5$ is not particularly critical. However, it should be ensured that the incorporation of these monomers does not lead to undesirable properties of the copolymer. The choice of components $m_5$ thus largely depends on the desired properties of the hardenable composition in respect of elasticity, hardness, compatibility and polarity.

Examples of suitable compounds as component $m_5$ are alkoxyethyl acrylates, aryloxyethyl acrylates and the corresponding methacrylates, such as, for example, butoxyethyl (meth)acrylate and phenoxyethyl (meth)acrylate, unsaturated compounds containing tertiary amino groups, such as, for example, N,N'-diethylaminoethyl methacrylate, 2-vinylpyridine, 4-vinylpyridine, vinylpyrroline, vinylquinoline, vinylisoquinoline, N,N'-dimethylaminoethyl vinyl ether and 2-methyl-5-vinylpyridine; compounds, such as, for example acrylonitrile, methacrylonitrile, acrolein and methacrolein.

Monomers containing at least two polymerizable double bonds can furthermore also be employed as component $m_5$, if appropriate together with other monomers of those just listed. Examples of suitable compounds are the compounds listed on pages 27 and 28 of this description. These monomers containing at leasts 2 double bonds are employed in small amounts, preferably in an amount of up to 5% by weight, based on the total weight of the monomers.

It is particularly advantageous for tertiary amino groups to be incorporated into the copolymer containing carboxyl groups, since they catalyze subsequent crosslinking of the polymer containing carboxyl groups with epoxide groups and in this way lower the stoving temperatures of coating agents based on these polymers.

If the copolymer contains tertiary amino groups, during the addition of unsaturated carboxylic acid anhydrides, such as, for example, during the addition of maleic anhydride, it must be ensured that no solvents which react with the unsaturated carboxylic acid anhydride under catalysis by the tertiary nitrogen groups are employed Acetone, methyl ethyl ketone, butyl acetate and other acetylating solvents, for example, therefore cannot be used. Hydrocarbons and polar solvents, such as dimethylformamide, dimethylacetamide, N-methylpyrrolidone etc., can be used.

The tertiary amino groups can be incorporated into the copolymer by use of monomers containing tertiary amino groups as component $m_5$.

Preferably, however, the tertiary amino groups are introduced by reaction of the polymer containing hydroxyl and carboxyl groups with compounds V which contain on average 0.8 to 1.5, preferably one, free isocyanate group and at least one tertiary amino group per molecule. However, it is also possible for the copolymer containing hydroxyl groups first to be reacted with the compounds V and only then for the carboxyl groups to be introduced into the copolymer by reaction with a carboxylic acid anhydride. In this case—as already mentioned—the reaction with the anhydride can be carried out at lower temperatures.

The amount of compound V is chosen here so that the resin formed has an amine number of 0 to 50 mg of KOH/g. If the copolymers are to be employed in coating agents which are hardened at room temperature, a higher amine number of 10 to 40 mg of KOH/g is established.

The compounds V used to introduce the tertiary amino group are prepared by reacting diisocyanates or polyisocyanates with less than the stoichiometric amount of a tertiary amine. Tertiary amines of the general formula $NR_1R_2R_3$, wherein $R_1$ preferably denotes an alkanol radical or another radical containing hydroxyl groups and $R_2$ or $R_3$ can represent alkyl or cycloalkyl radicals, are suitable for this reaction. Dialkylalkanolamines, such as, for example, dimethylethanolamine, diethylethanolamine and higher homologs or isomers thereof, are preferred.

Examples of suitable di- or polyisocyanates are: aromatic isocyanates, such as, for example, toluylene 2,4- and 2,6-diisocy,anate and mixtures thereof, diphenylmethane 4,4'-diisocyanate, m-phenylene diisocyanate, p-phenylene diisocyanate, diphenyl 4,4'-diisocyanate, naphthalene 1,5-diisocyanate, naphthalene 1,4-diisocyanate, toluidine 4,4'-diisocyanate, xylylene diisocyanate and substituted aromatic systems, such as, for example, dianisidine diisocyanates, diphenyl ether 4,4'-diisocyanates or chlorodiphenyl diisocyanates, and aromatic isocyanates containing a higher number of functional groups, such as, for example, 1,3,5-triisocyanatobenzene, 4,4',4''-triisocyanatotriphenylmethane, 2,4,6-triisocyanatotoluene and 4,4'-diphenyldimethylmethane 2,2',5,5'-tetraisocyanate; cycloaliphatic isocyanates, such as, for example, cyclopentane 1,3-diisocyanate, cyclohexane 1,4-diisocyanate, cyclohexane 1,2-diisocyanate and isophorone diisocyanate, and aliphatic isocyanates, such as, for example, trimethylene 1,6-diisocyanate, tetramethylene 1,6-diisocyanate, pentamethylene 1,6-diisocyanate, hexamethylene 1,6-diisocyanate, trimethylhexamethylene 1,6-diisocyanate and tris-hexamethylene triisocyanate.

Diisocyanates containing isocyanate groups of different reactivity are preferably employed, such as, for example, isophorone diisocyanate.

The reaction between the amine and the isocyanate is carried out at temperatures of 0° to 80° C., preferably of 20° to 50° C. The quantitative proportions of the reaction partners are chosen so that the compound V formed contains 0.8 to 1.5, preferably 1, free isocyanate groups.

In addition, there is also the possibility of reacting the copolymer containing hydroxyl and if appropriate carboxyl groups with carboxylic acids which contain a tertiary nitrogen atom. Examples of such carboxylic acids are 3- and 4-dimethylaminobenzoic acid, picolinic acid and dimethylaminosalicylic acid.

Finally, it is also possible for tertiary amino groups to be introduced into the copolymer containing carboxyl groups by reaction of some of the carboxyl groups and if appropriate carboxylic acid anhydride groups of the copolymer with compounds which, in addition to a tertiary amino group, also contain an alcohol or primary or secondary amino group or a thiol group.

Examples of alcohols containing tertiary amino groups are adducts of secondary amines and epoxide compounds. Examples of suitable secondary amines are dimethylamine, diethylamine, dipropylamine, dibutylamine, morpholine and pyrrolidine.

Examples of suitable epoxide compounds are ethylene oxide, propylene oxide, butylene oxide, styrene oxide and cyclohexene oxide.

Suitable alcohols which contain tertiary amino groups and are obtained by reaction of secondary amines with epoxide compounds are dimethylaminoethanol, diethylaminoethanol, di-n-propylaminoethanol, diisopropylaminoethanol, di-n-butylaminoethanol, N-(2-hydroxyethyl)morpholine, N-(2-hydroxyethyl)piperidine, N-(2-hydroxyethyl)pyrrolidone, N-(2-hydroxyethyl)aziridine, N,N'-dimethyl-2-hydroxypropylamine, N,N'-diethyl-2-hydroxypropylamine, triethanolamine and tripropanolamine.

Other examples of alcohols containing tertiary amino groups are vinyl polymers which have both a tertiary amino group as well as a hydroxyl group in the side chain and are obtainable by copolymerization of the (meth)acrylate monomers mentioned containing tertiary amino groups with monomers containing OH groups, such as, for example, β-hydroxyethyl (meth)acrylate.

Examples of the primary or secondary amines which contain a tertiary amino group are N,N'-dialkyl-1,3-propylenediamines, such as, for example, N,N'-dimethyl-1,3-propylenediamine, N,N'-diethyl-1,3-propylenediamine and N,N'-dialkyl-1,4-tetramethylenediamines, such as, for example, N,N'-dimethyl-1,4-tetramethylenediamine and N,N'-diethyl-1,4-tetramethylenediamine. N,N'-Dialkyl-1,6-hexamethylenediamines and N-alkylpiperazines as well as 2-aminopyridine, 4-aminopyridine and N-alkylaminopyridine are furthermore possible.

The tertiary amino groups can of course also be introduced into the copolymer A by a combination of various methods.

The copolymers which contain carboxyl groups and are employed as the essential binder component A in the coating agents according to the invention can also be prepared by means of free radical solution polymerization. Suitable copolymers containing carboxyl groups are therefore also the copolymers which contain carboxyl groups and are described in the PCT application with the international publication number WO 87/02041. These acrylate copolymers containing carboxyl groups are prepared by polymerization of the monomers in an organic solvent at temperatures between 70° and 130° C., preferably between 80° and 120° C., preferably using at least 0.5% by weight, preferably at least 2.5% by weight, based on the total weight of the monomers, of a polymerization regulator and in the presence of 0.5 to 7% by weight, based on the total weight of the monomers, of a polymerization initiator.

The polymerization is carried out in an organic solvent which is inert towards the monomers employed and towards carboxylic acid anhydrides Examples of suitable solvents are glycol ethers, such as, for example, diglycol dimethyl ether; aromatics, such as, for example, toluene, xylene, Solvent Naphtha ®, heavy benzene, various Solvesso ® grades, various Shellsol ® grades and Deasol, as well as higher-boiling aliphatic and cycloaliphatic hydrocarbons, such as, for example, various white spirits, mineral turpentine oil, tetralin and decalin.

If the copolymer contains tertiary amino groups, it must be ensured that no solvents which react with the unsaturated carboxylic acid anhydride under catalysis by the tertiary amino groups are employed.

The reaction is preferably carried out in the presence of polymerization regulators, since clouding of the polymer solutions can be avoided more easily in this way. Preferred suitable regulators are mercapto compounds, mercaptoethanol being particularly preferably employed. Examples of other possible regulators are alkylmercaptans, such as, for example, t-dodecylmercaptan, octylmercaptan, phenylmercaptan, octyldecylmercaptan and butylmercaptan, and thiocarboxylic acids, such as, for example, thioacetic acid or thiolactic acid.

The regulators are preferably dissolved in one of the monomer feeds and added together with the monomers. Suitable free radical initiators are the compounds in the description of the bulk polymerization. Other suitable initiators are azo initiators, such as, for example, azoisobutyronitrile, 2,2'-azobis(2-methylbutane-nitrile), 1,1'-azobis(cyclohexanecarbonitrile) and 2,2'-azobis(2-dimethylbutane-nitrile). The choice of the particular initiator depends here on the reaction conditions. If more than 1% by weight of mercaptan, based on the total weight of the monomers, is employed, non-oxidizing initiators are preferably employed. The initiator, dissolved in some of the solvent employed for the polymerization, is gradually metered in during the polymerization reaction The initiator feed preferably lasts about 0.5 to 1 hour longer than the monomer feed, so that a good action is thus also achieved during the after-polymerization phase. If initiators having a long half-life under the reaction temperatures which exist are employed, it is also possible for the initiator to be initially introduced into the vessel.

The copolymers containing carboxyl groups can be prepared by the solution polymerization just described of $l_1$) 0 to 30% by weight, preferably 5 to 20% by weight, of one or more monomers containing carboxyl groups, $l_2$) if appropriate more than 3 to 30% by weight, preferably 5 to 25% by weight, of one or more monomers containing at least two polymerizable olefinically unsaturated double bonds and $l_3$) at least 40% by weight of other copolymerizable ethylenically unsaturated monomers, the sum of the parts by weight of components $l_1$ to $l_3$ in each case being 100% by weight.

The properties of the copolymers containing carboxyl groups, such as, for example, solubility, can be selectively controlled by using monomers $l_2$ containing at least two polymerizable double bonds. However, copolymers which have been prepared using no monomers containing at least 2 polymerizable double bonds are of course also suitable for the coating agents according to the invention.

Compounds which can advantageously be used as component $l_2$ are those of the general formula

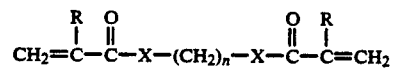

in which:

R denotes H or $CH_3$, X denotes O, NR' or S, where R' denotes H, alkyl or aryl, and n denotes 2 to 8.

Examples of such compounds are hexanediol diacrylate, hexanediol dimethacrylate, ethylene glycol diacrylate, ethylene glycol dimethacrylate, butanediol diacrylate, butanediol dimethacrylate, hexamethylenebismethacrylamide, trimethylolpropane triacrylate, trimethylolpropane trimethacrylate and similar compounds.

Combinations of the polyunsaturated monomers can of course also be employed.

Other possible components $l_2$ are reaction products of a carboxylic acid containing a polymerizable olefinically unsaturated double bond and glycidyl acrylate and/or glycidyl methacrylate. It is also possible to employ a polycarboxylic acid or unsaturated monocarboxylic acid esterified with an unsaturated alcohol containing a polymerizable double bond as component $l_2$. Diolefins, such as divinylbenzene, can furthermore also be employed. Reaction products of a polyisocyanate with alcohols or amines containing unsaturated polymerizable double bonds are also employed as unsaturated monomers containing at least two polymerizable olefinic double bonds. The reaction product of one mole of hexamethylene diisocyanate and 2 moles of allyl alcohol may be mentioned as an example of these. The ethylenically polyunsaturated monomers can advantageously be diesters of polyethylene glycol and/or polypropylene glycol having an average molecular weight of less than 1,500, preferably less than 1,000, and acrylic acid and/or methacrylic acid.

Examples of suitable monomers containing carboxyl groups (component $1_1$) are the compounds in the description of the copolymers which contain carboxyl groups and are prepared by means of bulk polymerization.

The choice of component $1_3$ largely depends on the desired properties of the coating agents in respect of elasticity, hardness, compatibility and polarity. Vinylaromatic compounds, hydroxyalkyl esters of $\alpha,\beta$-unsaturated carboxylic acids, alkyl esters of $\alpha, \beta$-unsaturated compounds, monomers containing tertiary amino groups and other ethylenically unsaturated monomers as well as combinations of these monomers are suitable. Examples of suitable compounds are the compounds in the descriptions of the bulk polymers containing carboxyl groups. In respect of further detail on the copolymers containing carboxyl groups, reference is furthermore made to the PCT application with the international publication number WO 87/02041, in which these copolymers are described in detail.

Analogously to the copolymers prepared by means of bulk polymerization, in the case of the copolymers prepared by means of solution polymerization the carboxyl groups can also be introduced by using monomers containing carboxyl groups and/or addition of carboxylic acid anhydrides onto copolymers containing hydroxyl groups. The tertiary amino groups present if appropriate can also be introduced into the copolymer in the most diverse ways. The copolymers which contain carboxyl groups and are prepared by means of solution polymerization usually have number-average molecular weights of 1,500 to 6,000, acid numbers of 15 to 200 mg of KOH/g, preferably 30 to 120 mg of KOH/g, and amine numbers of 0 to 50 mg of KOH/g, preferably 10 to 40 mg of KOH/g.

Finally, the copolymers which contain carboxyl groups and are described in the as yet unpublished patent application DE 3918669 are also suitable as the essential binder component A.

These copolymers containing carboxyl groups have a number-average molecular weight of 2,000 to 8,000, an acid number of 15 to 200 mg of KOH/g, preferably 30 to 120 mg of KOH/g, and an amine number of 0 to 50 mg of KOH/g, preferably 10 to 40 mg of KOH/g. They can be prepared by a procedure in which I) a copolymer containing hydroxyl groups and if appropriate carboxyl groups has been prepared by means of free radical solution polymerization at temperatures of 130° to 200° C., preferably 150° to 180° C., from $r_1$) 5 to 25% by weight, preferably 10 to 19% by weight, of one or more vinyl esters of aliphatic monocarboxylic acids which contain 5 to 15 C atoms per molecule and are branched in the $\alpha$-position, $r_2$) 10 to 50% by weight, preferably 20 to 45% by weight, of one or more vinylaromatic hydrocarbons, $r_3$) 5 to 40% by weight, preferably 15 to 35% by weight, of one or more hydroxyalkyl esters of $\alpha,\beta$-unsaturated carboxylic acids and $r_4$) 0 to 40% by weight of ethylenically unsaturated monomers containing carboxyl groups and/or other ethylenically unsaturated copolymerizable monomers, the sum of the parts by weight of components $r_1$ to $r_4$ in each case being 100% by weight, and II. if appropriate the copolymer obtained in stage I has been reacted with carboxylic acid anhydrides, the amount of carboxylic acid anhydrides employed being chosen so that the copolymer formed has a acid number of 15 to 200 mg of KOH/g, preferably 30 to 120 mg of KOH/g.

The solution polymerization of components $r_1$ to $r_4$ is carried out here in the presence of as a rule 0.1 to 5.0% by weight, based on the amount of monomer to be processed, of free radical initiator and preferably in the presence of up to 2% by weight of regulator, based on the amount of monomer to be processed. The addition of the regulators and initiators and examples of suitable regulators and initiators have already been mentioned in the description of the solution polymerization. Suitable solvents are listed previously in this description.

Because of the different reactivity of the monomers employed, it is decisive for the properties of the resulting copolymers for the polymerization to be carried out as follows:

At least 60% by weight, preferably 100% by weight, of the total amount of component $r_1$ to be employed is first initially introduced into the reactor together with some of the total amount of solvent to be employed and the mixture is heated up to the particular reaction temperature. The remainder of the solvent—as already described—is preferably added gradually together with the catalyst. Any remainder of component $r_1$ which still exists and the other monomers (components $r_2$, $r_3$ and $r_4$) are metered into the initially introduced component $r_1$ within a monomer addition time which is the same for all components (and is in general 2–10 hours, as is usual for acrylate copolymerizations) as follows:

i) The amount added per unit time of component $r_1$ which may still exist (that is to say the remainder of component $r_1$ which has not been initially introduced) remains constant or decreases within the monomer addition time, the latter process variant being preferred. In the case where a constant amount is added, component $r_1$ is preferably metered in together with components $r_3$ and $r_4$.

ii) The amount added per unit time of components $r_3$ and $r_4$ remains constant within the monomer addition period.

iii) The amount added per unit time of component $r_2$ is varied within the monomer addition time such that the total amount of component $r_2$ added within the first third of the monomer addition time is 15 to 30% by weight, preferably 18 to 26% by weight, of the total amount of component $r_2$. Within the second third of the monomer addition time, a total of 25 to 40% by weight, preferably 30 to 38% by weight, is metered in, and within the last third of the monomer addition time 35 to 60% by weight, preferably 40 to 50% by weight, of the total amount of component $r_2$ is metered in, the sum of the amounts added in the 1st 2nd and 3rd third of course being 100% by weight.

There are various possibilities for varying the amount added per unit time of component $r_2$, it merely being decisive that the abovementioned total amounts added in the particular third being observed. Thus, for example, there is the possibility of a stepwise change in the amount added per unit time of component $r_2$. The number of steps in which the particular amount added is changed can be chosen as desired. Thus, for example, the amount added per unit time of component $r_2$ can be increased only at the start of the second and/or at the start of the third third. The amount added per unit time then in each case remains constant within the third. However, it is also possible for the amount added per unit time of component $r_2$ to be changed continuously, corresponding to the limiting case of an infinite number of steps.

It is assumed that the addition of the components in the manner mentioned promotes the copolymerization and reduces homopolymerization of the individual components. In addition, copolymers having a very low residual monomer content are obtained, resulting in clear solutions having a high solids content.

The resulting copolymers, containing carboxyl groups if appropriate, preferably have an average molecular weight of 1,500 to 8,000 (number-average), and an OH number of 30 to 200 mg of KOH/g, preferably 70 to 150 mg of KOH/g. The resulting copolymers containing hydroxyl groups and if appropriate containing carboxyl groups are then reacted with carboxylic acid anhydrides in a second step to give the corresponding copolymers containing carboxyl groups. The amount of carboxylic acid anhydride employed here is chosen so that the resulting copolymer has an acid number of 15 to 200 mg of KOH/g, preferably 30 to 120 mg of KOH/g, and an OH number of 0 to 60 mg of KOH/g. The number-average molecular weight of the copolymer containing carboxyl groups is 2,000 to 8,000.

In addition to this preferred variant of introducing at least some of the carboxyl groups of the copolymer by addition of carboxylic acid anhydrides onto copolymers containing hydroxyl groups (obtained in stage I), there is of course also the possibility of incorporating the carboxyl groups into the copolymer by using corresponding amounts of monomers containing carboxyl groups as component $r_4$ directly in the polymerization.

Tertiary amino groups which are present if appropriate can be introduced into the copolymer in the most diverse ways.

The following statements may be made on the components $r_1$ to $r_4$ employed in this solution polymerization process:

Vinyl esters of monocarboxylic acids, preferably vinyl esters of monocarboxylic acids which contain 5 to 15 C atoms per molecule and are branched in the $\alpha$-position, are employed as component $r_1$. The branched monocarboxylic acids can be obtained by reaction of formic acids or carbon monoxide and water with olefins in the presence of a liquid, strongly acid catalyst; the olefins can be products obtained by cracking paraffinic hydrocarbons, such as mineral oil fractions, and can contain both branched and straight-chain acyclic and-/or cycloaliphatic olefins. When such olefins are reacted with formic acid or with carbon monoxide and water, a mixture of carboxylic acids in which the carboxyl group predominantly sits on a quaternary carbon atom is formed. Other olefinic starting substances are, for example, propylene trimer, propylene tetramer and diisobutylene The vinyl esters can also be prepared in a manner which is known per se from the acids, for example by reacting the acids with acetylene.

Vinyl esters of saturated aliphatic monocarboxylic acids which have 9-11 C atoms and are branched on the $\alpha$-C atom are particularly preferred—because of their good availability. The vinyl ester of p-tert.-butyl-benzoic acid is also particularly preferred. Examples of other suitable vinyl esters are vinyl acetate and vinyl propionate.

Examples of the compounds suitable as components $r_2$ to $r_4$ are the compounds already listed in the description of the solution polymers containing carboxyl groups, although no monomers containing at least two polymerizable double bonds can be employed as component $r_4$.

In addition to these polyesters and/or copolymers containing carboxyl groups which have been described, other polymers which contain carboxyl groups and have a number-average molecular weight of 500 to 8,000 and an acid number of 15 to 200 mg of KOH/g can of course also be employed as long as they lead to the desired properties of the coating agents. The coating agents contain the copolymer containing carboxyl groups (component A) in an amount of 10–70% by weight, based on the total weight of the coating agents. The copolymers containing epoxide groups (component B) are usually employed in an amount of 10 to 50% by weight, based on the total weight of the coating agents. The contents of organic solvents is 20 to 50% by weight, based on the total weight of the coating agents.

If appropriate, the coating agents can also contain a crosslinking catalyst. Tertiary amines, quaternary ammonium compounds, such as, for example, benzyltrimethylammonium hydroxide and benzyltrimethylammonium chloride, and specific chromium compounds as well as tin compounds are particularly suitable for this. The use of a crosslinking catalyst is of course superfluous in most cases in which tertiary amino groups are already incorporated in the acrylate copolymer. Lower stoving temperatures and shorter stoving times are achieved by using an internal or external crosslinking catalyst. The cross linking catalyst is preferably used in an amount of 0.5 to 10% by weight, based on the total weight of the di- or polyepoxide component and the binder component.

The coating agents according to the invention can furthermore also contain the customary pigments and fillers in the customary amounts, preferably 0 to 60% by weight, based on the total composition, and other customary auxiliaries and additives, such as, for example, flow control agents, silicone oils, plasticizers, such as phosphoric acid esters and phthalic acid esters, viscosity-regulating additives, delustering agents, UV absorbers and light stabilizers, in the customary amounts, preferably 0 to 10% by weight, based on the total composition.

These coating agents can be applied in the form of a film to a substrate by spraying, flooding, dipping, rolling, knife-coating or brushing, the film subsequently being hardened to a firmly adhering coating.

The coating agents according to the invention are suitable for automobile series painting and—if low hardening temperatures of between 20° and 80° C. can be used by appropriate choice of the hardener component (see above)—are also particularly suitable for refinishing of motor vehicles. They are employed in this context as a primer and a top or clear coat. The coating agents according to the invention are prepared by mixing the binders and crosslinking agents, if appropriate with addition of solvent. Pigments and/or fillers can be added, if appropriate, to the binder or the crosslinking agent by customary processes (dispersing, dissolvers and the like). Other additives employed if appropriate can be added both to the binder or to the crosslinking agent as well as to the finished coating agent.

The present invention thus also relates to a process for the preparation of coating agents containing A) one or more polymers which contain carboxyl groups and have a number-average molecular weight $M_n$ of 500 to 8,000 and an acid number of 15 to 200 mg of KOH/g as the essential binder component and B) one or more compounds containing epoxide groups as the crosslinking agent, in which the binder component A and the crosslinking agent B are mixed only shortly before application of the coating agents, wherein the compound B containing epoxide groups is a copolymer which contains epoxide groups, has a number-average molecular weight $M_n$ of 300 to 5,000, preferably 500 to 3,500, and a heterogeneity ($M_w/M_n$), measured by gel permeation chromatography, of $\leq 3$, preferably $\leq 2$, and has been prepared by continuous bulk polymerization at temperatures between 130° and 350° C. and pressures above 1 bar.

The invention is illustrated in more detail in the following examples All the parts and percentage data are weight data, unless expressly stated otherwise.

I.1. Preparation of the Epoxy Crosslinking Agent

A mixture of 15 parts of styrene, 40 parts of glycidyl methacrylate and 45 parts of n-butyl acrylate is heated at 230° C. in a continuously operating pressure autoclave. The residence time of the reaction mixture is 10 minutes. The pressure in the polymerization apparatus is kept in the range between 15 and 32 bar with the aid of a periodically oscillating pressure regulation. The reaction mixture is then forced through a static mixer for after-polymerization at 200° C. over a residence time of 15 minutes. Unreacted monomers are then distilled off in vacuo.

The epoxy resin is then dissolved in butyl acetate to give an 80% solution. The resulting resin solution has a viscosity of 25 s, measured in a DIN 4 flow cup at 23° C. The resulting epoxy resin has an epoxide equivalent weight of 316, based on the solid resin, a number-average molecular weight of 1,200 and a heterogeneity $M_w/M_n$ of 1.9, determined against a polystyrene standard by the method described in B. Vollmert, Grundriβ der makromolekularen Chemie (Principles of macromolecular chemistry), E. Vollmert Verlag, Karlsruhe 1982, Volume III, page 72 et seq.

II.1. Preparation of the Binder Component A Containing Carboxyl Groups 482.2 parts of hexahydrophthalic anhydride, 585.3 parts of 1,4-cyclohexanedicarboxylic acid, 611.8 parts of trimethylolpropane, 123.1 parts of hexane-1,6-diol, 155.2 parts of methyldiethanolamine, 79.6 parts of benzoic acid, 206.1 parts of isononanoic acid, 87.8 parts of xylene and 2.196 parts of triisodecyl phosphite are introduced into a 4 liter polycondensation kettle with a stirrer, steam-heated column and water separator and are slowly heated up. The condensation is carried out at a temperature of not more than 190° C. to an acid number of 9.1 mg of KOH/g and a viscosity of 4.2 dPas (50% in butylglycol), and the product is then cooled and partly dissolved with 387.4 parts of xylene at 130° C. 367.0 parts of hexahydrophthalic anhydride, 80.9 parts of xylene and 0.742 part of triisodecyl phosphite are now added to this solution. The anhydride is added at 80° C., until an acid number of 69.4 mg of KOH/g and a viscosity of 8 dPas (50% in butylglycol) is reached. The product is then partly dissolved with 718.6 parts of xylene and 182.1 parts of sec.-butanol. The polyester thus obtained has a solids content of 59.7%, an acid number of 67 mg of KOH/g (solid), an amine number of 31 mg of KOH/g, a viscosity (original) of 27.5 dPas and a color number of 1-2 (Gardner-Holdt).

II.2. Preparation of the Binder Component B Containing Carboxyl Groups

The following components are weighed into a 4 liter stainless steel polymerization kettle with a stirrer, reflux condenser, two monomer feeds and an initiator feed and heated up to 100° C. 484.0 parts of xylene and 161.0 parts of 1-methoxypropyl 2-acetate. The following are weighed into monomer feed A: 80.0 parts of dimethylaminoethyl methacrylate, 90.0 parts of xylene and 30 0 parts of 1-methoxypropyl 2-acetate.

The following are weighed into monomer feed B: 143.0 parts of methyl methacrylate, 120.0 parts of n-butyl acrylate, 120.0 parts of cyclohexyl methacrylate, 120.0 parts of 4-hydroxybutyl acrylate, 120.0 parts of hydroxyethyl methacrylate, 97.0 parts of divinylbenzene (62% strength in ethylstyrene), 22.4 parts of mercaptoethanol and 0.24 part of triisodecyl phosphite.

The following are weighed into the initiator feed: 19.2 parts of 2,2'-azobis(2-methylbutane-nitrile), 58.0 parts of xylene and 19.2 parts of 1-methoxypropyl 2-acetate.

All the feeds are started at the same time and the two monomer feeds are metered in uniformly in the course of 3 hours and the initiator feed is metered in over a period of 3.75 hours. The temperature in the kettle is kept at 108° to 100° C. during the polymerization. Afterpolymerization is then carried out for a further 2 hours. The resulting acrylate resin solution has a solids content of 51% and a viscosity of 24 dPas. 169.0 parts of hexahydrophthalic anhydride are now introduced and added onto the acrylate resin at 100° C. When the acid number determination results in the same values in aqueous and alcoholic KOH, the mixture is concentrated to a solids content of 55-56% by distilling off solvents and is then diluted to a solids content of 51% with sec.-butanol. The acrylate resin solution thus obtained has an acid number of 72 mg of KOH/g and a viscosity of 27 dPas, as well as an amine number of 28.6 mg of KOH/g.

II.3. Preparation of the Binder Component C Containing Carboxyl Groups

The following components are weighed into a 4 liter stainless steel polymerization kettle with a stirrer, reflux condenser, two monomer feeds and an initiator feed and are heated up to 100° C.: 382.0 parts of xylene and 382.0 parts of 1-methoxypropyl 2-acetate.

The following are weighed into the monomer feed A: 82.0 parts of dimethylaminoethyl methacrylate, 350.0 parts of mono-2-methacryloyloxyethyl hexahydrophthalate, 100.0 parts of xylene and 100.0 parts of 1-methoxypropyl 2-acetate.

The following are weighed into monomer feed B: 148.0 parts of butyl methacrylate, 124.0 parts of n-butyl acrylate, 124.0 parts of cyclohexyl methacrylate, 72.0 parts of hydroxypropyl methacrylate, 100.0 parts of divinylbenzene (62% in ethylstyrene), 24.0 parts of mercaptoethanol and 0.53 part of triisodecyl phosphite.

The following are weighed into the initiator feed: 20.0 parts of 2,2'-azobis(2-methylbutane-nitrile), 40.0 parts of xylene and 40.2 parts of 1-methoxypropyl 2-acetate.

The monomer feeds are started at the same time, and the initiator feed is started 10 minutes later. The two monomer feeds are metered in uniformly in the course of 3 hours, and the initiator feed is metered in over a period of 3.75 hours. The temperature in the kettle is kept at 108°–110° C. during the polymerization. After-polymerization is then carried out for a further 2 hours. The mixture is concentrated to a solids content of about 60% by distilling off the solvent, and is then diluted with sec.-butanol. The acrylate resin solution thus obtained has a solids content of 51% and an acid number of 67 mg of KOH/g, as well as an amine number of 34 mg of KOH/g.

II.4. Preparation of the Binder Component D Containing Carboxyl Groups 425.75 parts of Shellsol A ® (mixture of C3–C4-alkyl-substituted aromatics) and 400 parts of a commercially available mixture of vinyl esters of saturated aliphatic monocarboxylic acids which predominantly have 10 C atoms and are branched on the α-C atom are initially introduced into a 4 liter stainless steel kettle with a stirrer, reflux condenser and feed devices, and are heated up to 170° C.

The following are weighed into monomer tank I and mixed: 600.0 parts of hydroxyethyl methacrylate, 250.0 parts of n-butyl acrylate, 150.0 parts of N,N'-dimethylaminoethyl methacrylate, 200.0 parts of butyl methacrylate and 4.1 parts of triisodecyl phosphite.

The following are weighed into monomer tank II and mixed: 400 parts of styrene.

The following are weighed into the initiator tank and mixed: 22.0 parts of dicumyl peroxide and 66.0 parts of Shellsol A ®.

The contents of monomer tank I and the initiator tank are metered in uniformly in the course of 4.5 hours. The contents of monomer tank II are metered in over a period of 4.5 hours such that 100 parts are metered during the first 90 minutes, 140 parts are metered from the 91st to the 180th minute of the total running time and 160 parts of styrene are metered during the remaining feed time. During the feed, the temperature in the kettle is kept at 165°–170° C. When the feeds have ended, a further 5.0 parts of dicumyl peroxide and 15.0 parts of Shellsol A ®are metered in from the initiator tank in the course of 1 hour. After-polymerization is then carried out at this temperature for a further 2 hours. The product is then partly dissolved with 361 parts of xylene. The non-volatile content (1 hour, 130° C.) of this copolymer solution is 70% and the viscosity of the solution (50% in butyl acetate) is 3.25 dPas at 23° C.

1325.0 parts of this acrylate resin solution are weighed into a 4 liter stainless steel kettle with a stirrer and reflux condenser. After addition of 221.4 parts of hexahydrophthalic anhydride, the mixture is heated up to 130° C. and kept at this temperature until the acid numbers in an alcoholic and in an aqueous medium are the same and are 70–72 mg of KOH/g. The copolymer solution is partly dissolved to a solids content of 65% with 221.25 parts of xylene and further diluted with 321.5 parts of sec.-butanol.

The non-volatile content (1 hour, 130° C.) of this copolymer solution is 55% and the viscosity of the solution (50% in butyl acetate) is 24.5 dPas at 23° C. (ICI plate/cone viscosity). The copolymer has an acid number of 70 mg of KOH/g and an amine number of 24 mg of KOH/g.

II.5. Preparation of Binder Component E Containing Carboxyl Groups 419.75 parts of Shellsol A ® (mixture of C3-C4alkyl-substituted aromatics) and 300 parts of a commercially available mixture of vinyl esters of saturated aliphatic monocarboxylic acids which predominantly have 10 C atoms and are branched at the α-C atom are initially introduced into a 4 liter stainless steel kettle with a stirrer, reflux condenser and feed devices and are heated up to 170° C.

The following are weighed into monomer tank I and mixed: 700.0 parts of hydroxyethyl methacrylate, 200.0 parts of n-butyl acrylate, 200.0 parts of methyl methacrylate and 20.0 parts of mercaptoethanol.

The following are weighed into monomer tank II and mixed: 600.0 parts of styrene.

The following are weighed into the initiator tank and mixed: 26.0 parts of dicumyl peroxide and 78.0 parts of Shellsol A ®.

The contents of monomer tank I and of the initiator tank are metered in uniformly in the course of 4.5 hours. The contents of monomer tank II are metered in over a period of 4.5 hours such that 100 parts are metered in the first 90 minutes, 140 parts are metered from the 91st to the 180th minute of the total running time and 160 parts of styrene are metered in the remaining feed time. During the feed, the temperature in the kettle is kept at 165 to 170° C. When the feeds have ended, a further 5.0 parts of dicumyl peroxide and 15.0 parts of Shellsol A ® are metered in from the initiator tank in the course of 1 hour. After-polymerization is then carried out at this temperature for a further 2 hours. The product is subsequently partly dissolved with 427.3 parts of xylene and 427.3 parts of 1-methoxypropyl 2-acetate. The non-volatile content (1 hour, 130° C.) of this copolymer solution is 60% and the viscosity of the solution (50% in butyl acetate) is 10.80 dPas at 23° C. (ICI plate/cone viscosity).

1560.0 parts of this acrylate resin solution are weighed into a 4 liter stainless steel kettle with a stirrer and reflux condenser. After addition of 222.7 parts of hexahydrophthalic anhydride, the mixture is heated up to 130° C. and kept at this temperature until the acid numbers in an alcoholic and in an aqueous medium are the same and are 70–72 mg of KOH/g.

The mixture is then cooled to 60° C., and 296.6 parts of a 1:1 adduct of N,N'-dimethylethanolamine and isophorone diisocyanate and 12.9 parts of dibutyltin dilaurate are added. The temperature is kept at 60° C. until free isocyanate can no longer be detected. The copolymer solution is diluted to a solids content of 50% with 462.3 parts of sec.-butanol. The copolymer solution thus obtained has an acid number of 63 mg of KOH/g, a viscosity of 8.5 dPas at 23° C. and an amine number of 24 mg of KOH/g.

EXAMPLES 1–4

Coating agents 1 to 4 are prepared by mixing the epoxide crosslinking agent with the binder components containing carboxyl groups in the amounts stated in Table 1. These coating agents are adjusted to a flow viscosity of 25 s, measured in a DIN 4 cup at 23° C., with butyl acetate. The coating agents are applied to glass plates in a wet film thickness of 100 μm, dried under various conditions and then evaluated. Drying is carried out by a) storage at room temperature for 2 days or b) 30 minutes at 60° C. and subsequent storage at room temperature for 1 hour or c) 30 minutes at 100° C. and subsequent storage at room temperature for 1 hour.

On drying at room temperature (drying a), the resulting coatings already showed an absence of dust and tackiness after less than 2 hours. The coatings moreover showed in each case good resistance to petrol, a high gloss and a good hardness coupled with good flexibility with all the drying methods a, b or c.

TABLE 1

Compositions of coating agents 1 to 4 in parts by weight

|  | Coating agent 1 | Coating agent 2 | Coating agent 3 | Coating agent 4 |
|---|---|---|---|---|
| Crosslinking agent | 50 | 25.3 | 10 | 25.3 |
| Binder component A | 55 | — | — | — |
| Binder component B | 129 | — | — | — |
| Binder component C | — | 42.6 | — | — |
| Binder component D | — | — | 28.5 | — |
| Binder component E | — | — | — | 44.45 |

We claim:

1. A coating agent comprising:

A) a polymer selected from the group consisting of a copolymer containing carboxyl groups, a polyester containing carboxyl groups and mixtures thereof, said polymer having a number-average molecular weight $M_n$ of 500 to 8,000 and an acid number of 15 to 200 mg of KOH/g as the essential binder component; and B) at least one compound containing epoxide groups as crosslinking agents; wherein the compound B containing epoxide groups is a copolymer containing epoxide groups, has a number-average molecular weight $M_n$ of 300 to 5,000 and a heterogeneity $(M_w/M_n)$, measured by gel permeation chromatography, of $\leq 3$ and has been prepared by continuous bulk polymerization at temperatures between 130° and 350° C. and pressures above 1 bar of a) 10 to 60% by weight of at least one vinylaromatic hydrocarbon;

b) 10 to 50% by weight of at least one ethylenically unsaturated monomer containing at least one epoxide group per molecule; and c) 5 to 80% by weight of other ethylenically unsaturated copolymerizable monomers; the sum of the weight contents of components (a) to (c) in each case being 100% by weight.

2. A process for the preparation of a coating agent comprising:

A) a polymer selected from the group consisting of a copolymer containing carboxyl groups, a polyester containing carboxyl groups and mixtures thereof, said polymer having a number-average molecular weight $M_n$ of 500 to 8,000 and an acid number of 15 to 200 mg of KOH/g as the essential binder component and B) one or more compounds containing epoxide groups as the crosslinking agent, which comprises: mixing the binder component A and the crosslinking agent B only shortly before application of the coating agent, wherein the compound B containing epoxide groups is a copolymer which contains epoxide groups, has a number-average molecular weight $M_n$ of 300 to 5,000, and a heterogeneity $(M_w/M_n)$, measured by gel permeation chromatography, of $\leq 3$, and has been prepared by continuous bulk polymerization at temperatures between 130° and 350° C. and pressures above 1 bar of a) 10 to 60% by weight of one or more vinylaromatic hydrocarbons, b) 10 to 50% by weight of one or more ethylenically unsaturated monomers containing at least one epoxide group per molecule and c) 5 to 80% by weight of other ethylenically unsaturaged copolymerizable monomers, the sum of the weight contents of components (a) to (c) in each case being 100% by weight.

3. A coating agent as claimed in claim 1, wherein the compound B has a number-average molecular weight $M_n$ of 500 to 3,500.

4. A coating agent as claimed in claim 1, wherein the compound B has a heterogeneity $(M_w/M_n)$, measured by gel permeation chromatographly, of $\leq 2$.

5. A coating agent as claimed in claim 1, wherein the copolymer B containing epoxide groups has been prepared by bulk polymerization of a) 15 to 50% by weight, of one or more vinylaromatic hydrocarbons, b) 15 to 50% by weight of one or more ethylenically unsaturated monomers containing at least one epoxide group per molecule and c) 20 to 50% by weight, of other ethylenically unsaturated copolymerizable monomers, the sum of the weight contents of components (a) to (c) in each case being 100% by weight.

6. A coating agent as claimed in claim 1, wherein the copolymer B containing epoxide groups has been prepared using glycidyl methacrylate as one of the ethylenically unsaturated monomers.

7. A coating agent as claimed in claim 1, wherein the copolymer B containing epoxide groups has been prepared using alkyl esters selected from the group consisting of acrylic acid, methacrylic acid or mixtures thereof as one of the ethylenically unsaturated monomers.

8. A coating agent as claimed in claim 1, wherein the copolymer B containing epoxide groups has an epoxide equivalent weight of 150 to 2,000.

9. A coating agent as claimed in claim 8, wherein the copolymer B containing epoxide groups has an epoxide equivalent weight of 500 to 1,000.

10. A coating agent as claimed in claim 1, wherein the polymers which contain carboxyl groups and are employed as the binders A have an acid number of 30 to 120 mg of KOH/g.

11. A coating agent as claimed in claim 1, wherein the polymers which contain carboxyl groups and are employed as the binders A have an amine number of 0 to 50 mg of KOH/g.

12. A coating agent as claimed in claim 1, wherein the polymers which contain carboxyl groups and are employed as the binders A have an amine number of 10 to 40 mg of KOH/g.

13. A coating agent as claimed in claim 1, wherein the polymers which contain carboxyl groups and are employed as the binders A have been prepared by a procedure in which a polymer containing hydroxyl groups and having an OH number of 30 to 200 mg of KOH/g has first been prepared and has then been reacted with carboxylic acid anhydrides to give the corresponding polymers containing carboxyl groups.

14. A coating agent as claimed in claim 1, wherein the polymers which contain carboxyl groups and are employed as the binders A have likewise been prepared by continuous bulk polymerization at temperatures between 130° and 350° C. and pressures above 1 bar.

15. A coating agent as claimed in claim 1, wherein the polymers which contain carboxyl groups and are employed as the binders A are copolymers prepared by free radical solution polymerization.

16. A coating agent as claimed in claim 1, wherein the coating agent contains:

A) 10 to 70% by weight, based on the total weight of the coating agent, of binder A containing carboxyl groups;

B) 10 to 50% by weight, based on the total weight of the coating agent, of crosslinking agent B containing epoxide groups;

C) 20 to 50% by weight, based on the total weight of the coating agent, of one or more organic solvents; and D) 0 to 60% by weight, based on the total weight of the coating agent, of pigments and fillers; and E) 0 to 10% by weight, based on the total weight of the coating agent, of customary auxiliaries and additives.

17. A process for automobile repair refinishing, wherein a coating agent as claimed in claim 1 is applied.

18. A process for automobile series painting, where a coating agent as claimed in claim 17 is applied.

* * * * *